Figure 1:
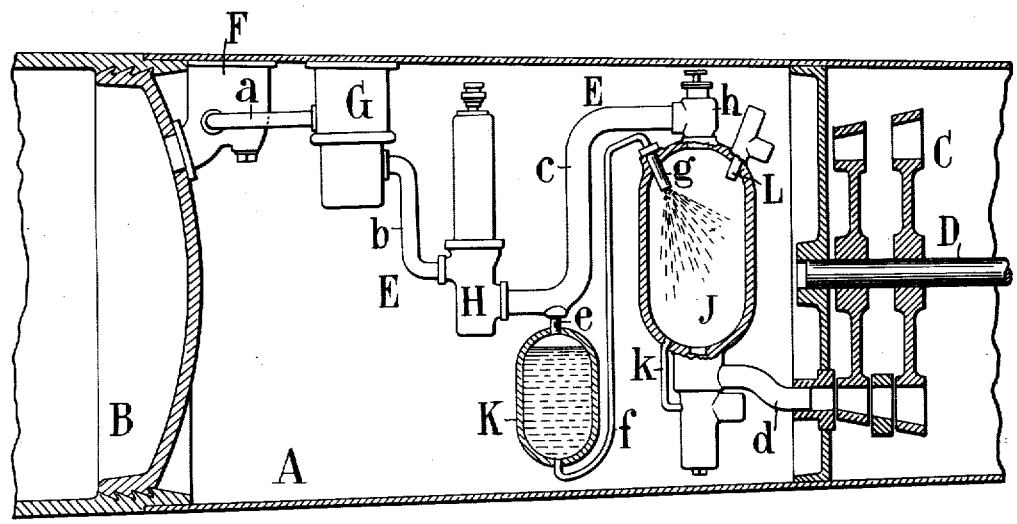

H. W. SHONNARD & W. DIETER.
AIR HEATER FOR COMPRESSED AIR ENGINES.
APPLICATION FILED MAY 21, 1907.

927,434.

Patented July 6, 1909.
2 SHEETS—SHEET 1.

WITNESSES:
Fred White
René Bruine

INVENTORS:
Harold W. Shonnard
and William Dieter,
By Attorneys,

H. W. SHONNARD & W. DIETER.
AIR HEATER FOR COMPRESSED AIR ENGINES.
APPLICATION FILED MAY 21, 1907.

927,434.

Patented July 6, 1909.
2 SHEETS—SHEET 2.

WITNESSES:
Fred White
René Bruine

INVENTORS:
Harold W. Shonnard,
and William Dieter,
By Attorneys.

UNITED STATES PATENT OFFICE.

HAROLD W. SHONNARD, OF EAST ORANGE, NEW JERSEY, AND WILLIAM DIETER, OF NEW YORK, N. Y., ASSIGNORS TO E. W. BLISS COMPANY, OF BROOKLYN, NEW YORK, A CORPORATION OF WEST VIRGINIA.

AIR-HEATER FOR COMPRESSED-AIR ENGINES.

No. 927,434.     Specification of Letters Patent.      Patented July 6, 1909.

Application filed May 21, 1907. Serial No. 374,824.

*To all whom it may concern:*

Be it known that we, HAROLD W. SHONNARD, residing in East Orange, in the county of Essex and State of New Jersey, and WILLIAM DIETER, residing in the borough of Brooklyn, county of Kings, city and State of New York, both citizens of the United States, have jointly invented certain new and useful Improvements in Air - Heaters for Compressed-Air Engines, of which the following is a specification.

In utilizing compressed air as a source of power it is desirable to provide means for heating the compressed air before admitting it to the engine, in order to increase the energy of the engine and avoid the inconveniences attending the expansion of unheated compressed air. This method is of especial importance in automobile torpedoes. For this purpose, owing to the brief time available, the heating is necessarily performed by the burning of a fluid fuel such as alcohol or gasolene directly in the compressed air, so that the hot products of combustion commingle with the heated air and flow to the engine. The heater or combustion chamber is in some cases placed within the compressed air reservoir; in other cases it is formed as an enlargement in the pipe or conduit leading from the reservoir to the engine.

It is necessary to perform the ignition at the moment of launching the torpedo, and substantially coincident with the admitting of air to start the engine. Difficulty has been experienced in accomplishing the ignition in the powerful stream of compressed air flowing through the combustion chamber to the engine.

The object of our invention is to provide means for obviating this disadvantage.

According to our invention we provide special means for controlling the flow of air whereby the air is retained in a sufficiently quiescent condition in the combustion chamber during the operation of the igniter to enable the ignition to be performed with certainty, and thereupon the full normal flow of air is established through the chamber.

Our invention may be variously realized, but preferably the air is first admitted to the combustion chamber upon the opening of the starting valve, and is kept momentarily from flowing out therefrom, or its outflow is restricted to a relatively small volume; during this momentary interval the introduction of liquid fuel into the chamber has commenced, and at the proper instant the igniter acts to vaporize and ignite the fuel, thereby filling the chamber with flame; at the end of the momentary interval prescribed for insuring these operations, a controlling valve or device automatically operates to cause the full flow of air to take place through the chamber.

Figure 2:
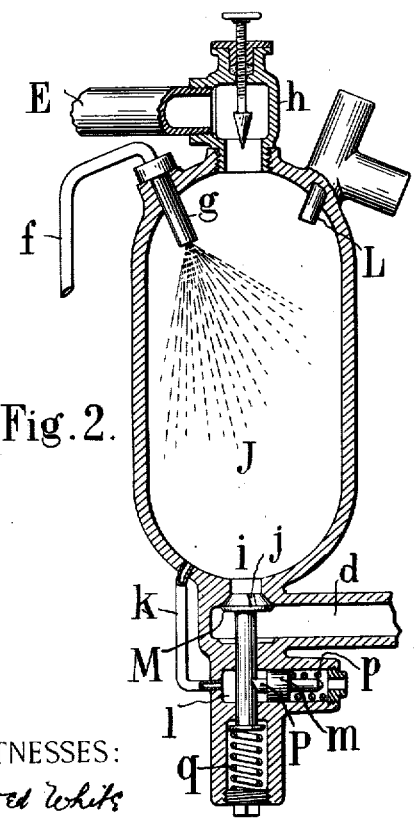
Figure 3:
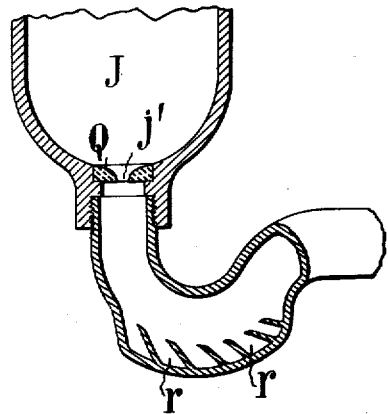
Figure 4:
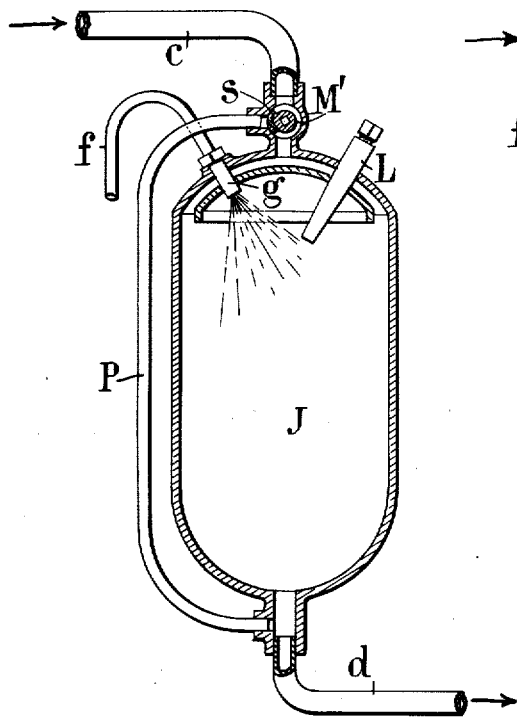
Figure 5:
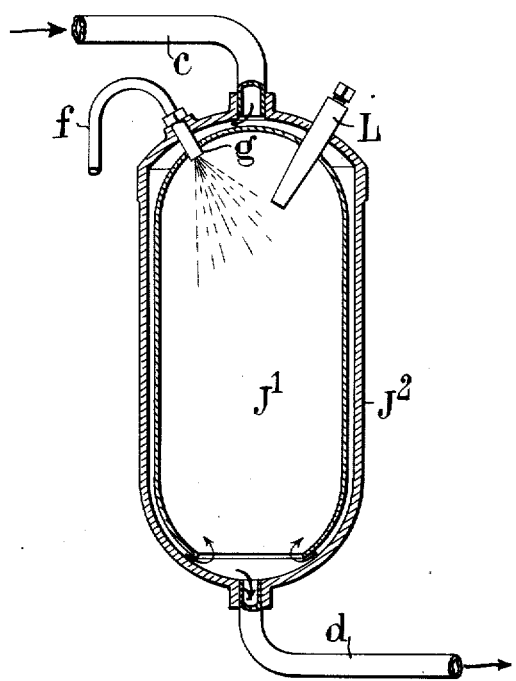
Figure 6:
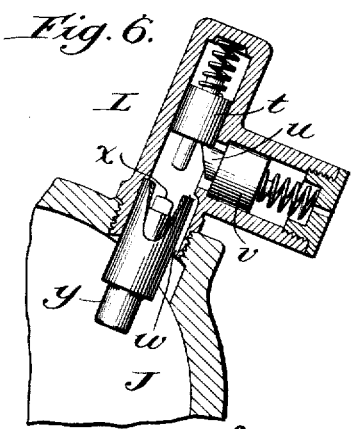

Referring to the accompanying drawings,— Figure 1 is a fragmentary longitudinal vertical section of the middle portion of an automobile torpedo, showing one application of our invention thereto. Fig. 2 shows the combustion chamber and its related parts on a larger scale in vertical mid-section. Fig. 3 is a fragmentary section of a modification. Figs. 4 and 5 are views similar to Fig. 2, illustrating modifications. Fig. 6 is an enlarged fragment of Fig. 2, showing in section a suitable construction of automatic igniters.

Referring first to Fig. 1, let A designate the torpedo hull or shell, B the compressed air reservoir, C the engine, which in this instance is shown as a turbine, and D the propeller shaft driven by the engine and extending aft for driving the propeller screws. The compressed air passes from the reservoir B to the engine through a conduit E E, which comprises a pipe $a$ leading from the usual filling and stop valve F to any suitable starting valve G, a pipe $b$ leading thence to any suitable pressure-reducing valve H, a pipe $c$ leading thence to the combustion chamber or so-called superheater J, and the pipe $d$ leading thence to the nozzle or inlet of the turbine. The valves referred to may be of any usual or suitable construction, and the chamber J may be otherwise located. K is the receptacle for liquid fuel, commonly called the fuel pot; $e$ is a pipe admitting compressed air thereto from the pipe $c$, and $f$ is a pipe for conveying the liquid fuel therefrom to the atomizing or spraying nozzle $g$ or otherwise into the chamber J; $h$ is any suitable valve or obstruction for controlling the flow of air to the chamber J and thereby determining the rate of introduction of the fuel; L is the igniter of any suitable construction. So far as described there is no novelty in the parts referred to.

In the normal operation of such apparatus, upon the launching of the torpedo the starting valve G is automatically opened, whereby air is admitted to the reducer H which lowers its pressure and admits it through the chamber J directly to the engine. A portion of the air flowing through the by-pass or shunt e expels the alcohol or other fluid from the reservoir K, and introduces it into the chamber J in a spray or otherwise; this result occurs almost instantaneously upon the admission of air, and at the proper instant the igniter L operates to direct a flame into the chamber J and into contact with the entering fuel so as to ignite the same. The igniting operation should be instantaneous, and, the ignition once effected, the combustion should maintain itself with such intensity that the powerful stream or blast of compressed air flowing through the combustion chamber will not blow out the flame. The air flowing to the engine is thus highly heated, and its volume augmented by the admixture with it of the gaseous products of combustion.

It has been found in practical use of such a combination of apparatus that the ignition is not accomplished with certainty, and under some conditions it is extremely difficult to effect the ignition at all. This we explain upon the theory that the powerful stream of compressed air blowing through the combustion chamber prevents the flame from the igniter accomplishing the vaporization of the liquid fuel (alcohol) and its ignition so as to generate heat enough to maintain the vaporization and ignition of the fuel which continues to enter; or it may be that the blast is so powerful that it blows out the flame before the combustion becomes fierce enough to maintain and propagate the flame at a more rapid rate than the flow of the air.

Proceeding upon the theory that it is the too powerful current of air which defeats the requisite certainty in ignition, our invention seeks to check or even arrest the flow of air, so as to maintain the air within the combustion chamber sufficiently quiescent, and for a sufficient duration of time, to insure the ignition of the fuel. The combustion once instituted, it is necessary, in order to maintain it, to introduce air in large volume, or proportionally to the rate of introduction of the fuel; accordingly we provide that after the momentary retardation which insures the ignition, the full or a sufficient flow of air shall be directed through the combustion chamber.

The construction shown best in Fig. 2 is adapted to carry our invention into effect. The outlet i from the chamber J is primarily closed by a valve M which is held to its seat by a catch P engaging the valve stem. The valve has preferably a groove or leak-opening j which will permit a small stream of air to flow through before the valve opens, for the purpose primarily of gently starting the engine in advance of the full rush of air, and secondarily of causing a limited flow of air to pass through the combustion chamber to insure a supply of oxygen to the flame during the brief interval between the ignition and the opening of the valve M.

For opening the valve M provision is made for automatically withdrawing the catch P at the end of a brief interval of time following the preliminary admission of air. For this purpose a restricted duct k is provided receiving compressed air from the chamber J or other source, and admitting it to a chamber l in which works the piston or plunger m of the catch P. When the starting valve G is opened at launching, the air is instantly admitted through the reducing valve H to the combustion chamber J, which it instantly fills with compressed air, and then ensues a brief delay while the air is flowing out through the duct k into the chamber l until it attains enough pressure therein to overcome the tress of the spring p, whereupon it forces back the catch P, and the valve M instantly flies open and permits the full outflow to occur through the combustion chamber to the engine. The brief delay thus involved affords the momentary retardation which insures the successful ignition. The igniter L is constructed to operate sufficiently in advance of the catch P to take advantage of the approximate quiescence due to the momentary retardation or imprisonment of the air.

For automatically resetting the valve M after the operation, it may be provided with a spring q, which, when the run is over and the air pressure has blown itself out, will lift the valve back against the seat, where it is again caught and held by the catch P.

The igniter L might be an electric igniter, but is preferably an igniter of the "pistol" type which is operated by the admission of compressed air, and ignites a cartridge, the burning of which projects the igniting flame into the chamber J. The construction of the igniter, however, forms no part of our invention, it being only requisite that it shall be adapted to operate at the proper instant and before the opening of the valve M.

A suitable construction of the igniter is shown in Fig. 6, where a spring-pressed plunger or hammer t is restrained by a sear u carried by a spring-pressed piston v. Upon the first admission of compressed air to the chamber J the air enters the shell of the igniter (through any suitable opening, as a duct w for example) and forces back the piston v, thereby releasing the hammer t which is projected by its spring so that its end strikes a percussion cap x and ignites the cartridge y.

Fig. 3 illustrates a modification wherein the valve M is substituted by a thermic device which is adapted to open and admit the flow of air only upon the completion of the ignition. A fusible disk Q is placed in the outlet from the chamber J, being preferably formed with a small hole $j'$ through it for the same purpose as the hole $j$ in the valve M. The outflow of air through this hole carries the flame to it as soon as the ignition occurs, so that the fusible disk is quickly melted and carried out of the heater, leaving the full outlet opening. If made of vaporizable material it is permitted to simply blow out through the engine without harm, but otherwise its particles may be caught centrifugally in pockets $r\,r$. Of course a new fusible disk must be applied before the next operation.

Our invention may be variously otherwise modified without departing from its essential features. For example, it is not essential that the combustion chamber be located in the sole conduit from the reservoir to the engine, as a by-pass might be arranged around the chamber to convey the air at first to start the engine, and upon accomplishing the ignition a valve might be operated to direct the main flow through the combustion chamber. This is shown in Fig. 4, where P is the by-pass, and M' is the valve, which may be operated by the same means as the valve M in Fig. 2. At starting, the valve is closed to the combustion chamber J, but a small vent $s$ admits a sufficient flow of air to start the combustion. Or the combustion chamber proper might be within another chamber so that the air would be distributed uniformly around the combustion chamber in such manner that an eddy current would enter such chamber, so that the air in the combustion chamber proper would be held sufficiently quiescent during the ignition, while after ignition the eddy current would supply sufficient oxygen to maintain combustion. This is shown in Fig. 5, where $J^1$ is the inner chamber and $J^2$ the outer chamber.

Our invention is even applicable with a combustion chamber which is located within the main reservoir.

Our invention is chiefly useful where the propelling engine is of the turbine type, and where the combustion chamber is introduced in the main conduit from the reservoir to the engine, or in a branch thereof.

We make herein no specific claim to the constructions shown in Figs. 4 and 5, the same being specifically claimed in our divisional application filed February 8, 1909, Serial No. 476,785.

We claim as our invention:—

1. The combination of a compressed air reservoir, an engine, a conduit leading from the reservoir to the engine, a combustion chamber in communication with said conduit, means for feeding fluid fuel into said chamber during the run of the engine, means for igniting it therein upon the starting of the engine, and automatic means for momentarily holding back the flow of air through said chamber during the operation of the igniting means to insure the ignition.

2. In an automobile torpedo, the combination of a compressed air reservoir, an engine, a conduit leading from the reservoir to the engine, a combustion chamber in communication with said conduit, means for feeding fluid fuel into said chamber during the run of the torpedo, means for igniting it therein upon the launching of the torpedo, a starting valve, and automatic means adapted upon the admission of compressed air to said chamber to retain it there momentarily during the ignition, and then to release it and permit a full flow of air through the chamber.

3. In an automobile torpedo, the combination of a compressed air reservoir, an engine, a conduit leading from the reservoir to the engine, a combustion chamber in communication with said conduit, means for feeding fluid fuel into said chamber during the run of the torpedo, means for igniting it therein upon the launching of the torpedo, a starting valve, and an automatic valve at the outlet from the combustion chamber adapted to momentarily retain the compressed air therein during the ignition.

In witness whereof, we have hereunto signed our names in the presence of two subscribing witnesses.

HAROLD W. SHONNARD.
WILLIAM DIETER.

Witnesses:
C. R. GABRIEL,
H. C. SEAMAN.